(12) United States Patent
Coe

(10) Patent No.: US 9,645,710 B2
(45) Date of Patent: May 9, 2017

(54) METHOD AND APPARATUS FOR FACILITATING MESSAGE SELECTION AND ORGANIZATION

(71) Applicant: YAHOO! INC., Sunnyvale, CA (US)

(72) Inventor: Brian Coe, Scotts Valley, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 15/083,905

(22) Filed: Mar. 29, 2016

(65) Prior Publication Data

US 2016/0210003 A1 Jul. 21, 2016

Related U.S. Application Data

(63) Continuation of application No. 13/857,929, filed on Apr. 5, 2013, now Pat. No. 9,304,665.

(51) Int. Cl.
*G06F 3/0482* (2013.01)
*G06F 3/0484* (2013.01)
*H04L 12/58* (2006.01)

(52) U.S. Cl.
CPC ........ *G06F 3/0482* (2013.01); *G06F 3/04842* (2013.01); *H04L 51/00* (2013.01); *H04L 51/22* (2013.01)

(58) Field of Classification Search
CPC ... G06F 3/0482; G06F 3/04842; G06F 3/0484
USPC .................................................. 715/752, 825
See application file for complete search history.

(56) References Cited

U.S. PATENT DOCUMENTS

| | | | |
|---|---|---|---|
| 2013/0013634 A1* | 1/2013 | Buchheit | G06Q 10/10 707/769 |
| 2013/0332850 A1* | 12/2013 | Bovet | H04L 51/22 715/752 |

* cited by examiner

*Primary Examiner* — Andrea Leggett
(74) *Attorney, Agent, or Firm* — James J. DeCarlo; Greenberg Traurig LLP

(57) ABSTRACT

One or more messages may be selected and grouped and one or more group-level actions may be initiated for the group, such that the group-level action is performed on each message in the group. Each message in a group shares the at least one attribute value. A messaging user interface may comprise a listing of the set of messages and a message group display portion that displays one or more message groups and a group-level toolbar comprising a selectable indicator for each group-level action. A message, or messages, shown in a message list portion of the user interface may be selected from the message list based on similarity of the message(s) to previously selected messages, and the selected message(s) may be grouping based on shared attribute values. The messages belonging to a group may be modified in the same way via a single action taken on the group.

21 Claims, 11 Drawing Sheets

METHOD AND APPARATUS FOR FACILITATING MESSAGE SELECTION AND ORGANIZATION

CROSS REFERENCE TO RELATED APPLICATIONS

This application is a continuation of and claims priority from co-pending U.S. patent application Ser. No. 13/857,929, filed Apr. 5, 2013, entitled METHOD AND APPARATUS FOR FACILITATING MESSAGE SELECTION AND ORGANIZATION, which is hereby incorporated by reference.

FIELD OF THE DISCLOSURE

The present disclosure relates to messaging, including without limitation electronic mail, or e-mail, messaging, and more particularly to facilitating selection and organization of messages and grouping messages, such that messages belonging to a given group have one or more attribute values in common, via a messaging user interface.

BACKGROUND

Most computer users communicate with other computer users using at least one messaging application, such as without limitation an e-mail client, which executes on the user's computing device. The popularity of such communication has grown and continues to increase. Consequently, a user receives many messages, which are typically stored in one or more application-generated and/or user-generated folders. One such folder which is typically the location that includes e-mail messages received by the user, is the user's e-mail inbox folder. It is difficult for a user to manage and organize the messages received by the user.

SUMMARY

The present disclosure seeks to address failings in the art and to provide a method and apparatus facilitating management and organization of messages. The message may be an electronic message, but is not limited to an e-mail message and may be any type of message, such as without limitation a text message, short message, multimedia message, etc. In accordance with one or more embodiments, one or more messages from a set of messages may be selected and grouped based on shared attribute values. In accordance with one or more embodiments, user interface enables message selection and comprises a message list portion and a message selection assistant portion. Messages may be selected using either portion of the user interface. By way of a non-limiting example, messages may be individually selected using the message list portion, and messages may be selected as a group using the message selection assistant portion. In accordance with one or more such embodiments, the message selection assistant portion comprises one or more message group selection controls, each control represents a group of messages that share one or more attribute values; the messages belonging to a message group, may comprise both selected and unselected messages. In accordance with one or more embodiments, a message group selection control is selectable to cause all of the messages that share the one or more attribute values to be selected in response to selection of the control. In accordance with one or more embodiments, a message group selection control may be used to de-select messages as a group. In accordance with one or more embodiments, messages selected using the user interface may be manipulated, e.g., marked as read, marked as important, marked as spam, moved to a saved message folder, deleted, marked as unread, etc. In accordance with one or more embodiments, in response to a message, or messages, being selected, all of the messages currently selected are examined to identify message groups, with each such message group representing messages that have one or more attribute values in common.

In accordance with one or more embodiments, a method is provided, the method comprising providing, via at least one computing device, a messaging user interface comprising a message list portion and a message group display portion, each entry displayed in the message list portion corresponding to a message of a plurality of messages, each message having one or more attributes and corresponding values, each message group displayed in the message group portion corresponding to a search criteria comprising at least one attribute value, the search criteria for grouping one or more messages that have the at least one attribute value in common; receiving, via the at least one computing device, input indicative of a selection of one or more messages displayed in the message list portion of the messaging user interface; in response to receiving the input indicative of a selection of one or more messages: updating, via the at least one computing device, the message list portion to indicate that each of the one or more messages is a selected message; analyzing, via the at least one computing device, each of the messages selected in the message list portion to identify one or more message group, each message group having associated search criteria comprising at least one attribute value identified by analyzing each selected message to identify one or more attribute values of at least one selected message; and updating, via the at least one computing device, the message group display portion to display an indicator for each of the one or more message groups, the indicator being selectable to initiate an operation to select a group of messages from the message list portion that have the at least one attribute value associated of message group associated with the indicator.

In accordance with one or more embodiments a system is provided, which system comprises at least one computing device comprising one or more processors to execute and memory to store instructions to provide a messaging user interface comprising a message list portion and a message group display portion, each entry displayed in the message list portion corresponding to a message of a plurality of messages, each message having one or more attributes and corresponding values, each message group displayed in the message group portion corresponding to a search criteria comprising at least one attribute value, the search criteria for grouping one or more messages that have the at least one attribute value in common; receive input indicative of a selection of one or more messages displayed in the message list portion of the messaging user interface; in response to receipt of the input indicative of a selection of one or more messages: update the message list portion to indicate that each of the one or more messages is a selected message; analyze each of the messages selected in the message list portion to identify one or more message group, each message group having associated search criteria comprising at least one attribute value identified by analyzing each selected message to identify one or more attribute values of at least one selected message; and update the message group display portion to display an indicator for each of the one or more message groups, the indicator being selectable to initiate an operation to select a group of messages from the message list portion that have the at least one attribute value associated of message group associated with the indicator.

In accordance with yet another aspect of the disclosure, a computer readable non-transitory storage medium is provided, the medium for tangibly storing thereon computer readable instructions that when executed cause at least one processor to provide a messaging user interface comprising a message list portion and a message group display portion, each entry displayed in the message list portion corresponding to a message of a plurality of messages, each message having one or more attributes and corresponding values, each message group displayed in the message group portion corresponding to a search criteria comprising at least one attribute value, the search criteria for grouping one or more messages that have the at least one attribute value in common; receive input indicative of a selection of one or more messages displayed in the message list portion of the messaging user interface; in response to receipt of the input indicative of a selection of one or more messages: update the message list portion to indicate that each of the one or more messages is a selected message; analyze each of the messages selected in the message list portion to identify one or more message group, each message group having associated search criteria comprising at least one attribute value identified by analyzing each selected message to identify one or more attribute values of at least one selected message; and update the message group display portion to display an indicator for each of the one or more message groups, the indicator being selectable to initiate an operation to select a group of messages from the message list portion that have the at least one attribute value associated of message group associated with the indicator.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an exemplary component overview in accordance with one or more embodiments of the present disclosure.

FIG. 2 provides an example of a message selection user interface in accordance with one or more embodiments of the present disclosure.

FIG. 3 provides a message selection data flow in accordance with one or more embodiments of the present disclosure.

FIG. 4 provides an enhanced message selection data flow in accordance with one or more embodiments of the present disclosure.

FIG. 5 provides an example of a user interface in accordance with one or more embodiments of the present disclosure.

FIG. 6 provides an example of the user interface of FIG. 5 with a group-level toolbar being displayed in connection with a group displayed in the user interface in accordance with one or more embodiments of the present disclosure.

FIG. 7 provides an example of the user interface of FIG. 5 in connection with a group-level add action in accordance with one or more embodiments of the present disclosure.

FIG. 8 provides an example of the user interface of FIG. 5 in connection with a group-level undo action in accordance with one or more embodiments of the present disclosure.

FIG. 9 provides an example of the user interface of FIG. 5 in connection with a group-level move action in accordance with one or more embodiments of the present disclosure.

DETAILED DESCRIPTION

Figure 1:
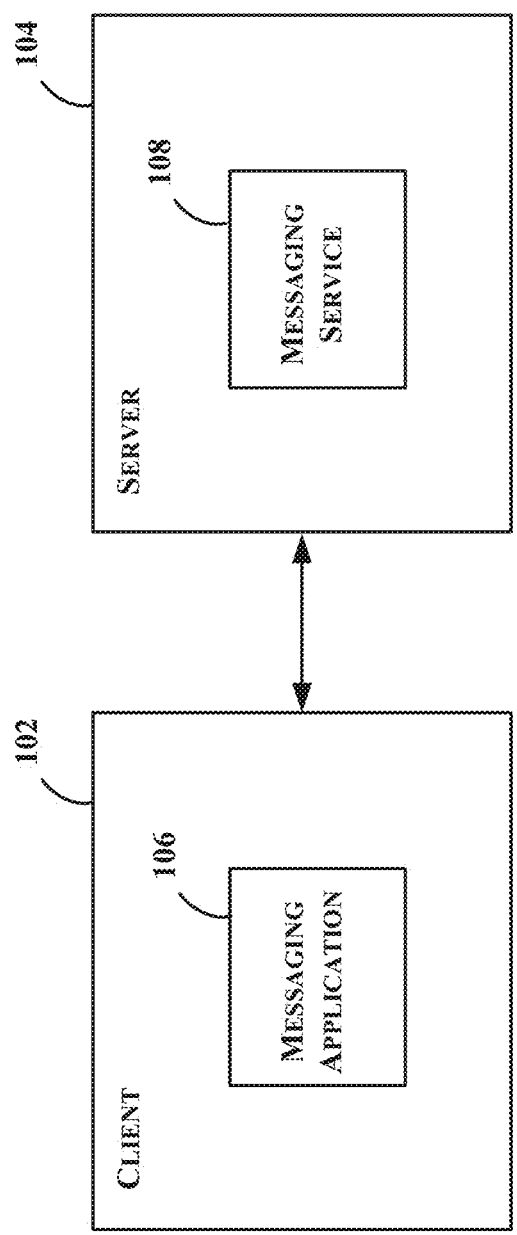

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a system, method and architecture for facilitating management and organization of messages. The message may be an electronic message, but is not limited to an e-mail message. In accordance with one or more embodiments, one or more messages from a set of messages may be selected and grouped and one or more group-level actions may be initiated for the group, and in response, the group-level action is performed on each message belonging to the group. In accordance with one or more embodiments, the one or more messages that are grouped may be selected by the user and/or automatically selected for the user. In accordance with one or more embodiments, each message has one or more attributes and corresponding values, and messages are grouped based on at least one attribute value, such that each message in the group shares the at least one attribute value. In accordance with one or more embodiments, a messaging user interface comprises a listing of the set of messages, which listing may display one or more of each message's attribute values. The user interface may further comprise a message group display portion that displays one or more message groups and a toolbar comprising a selectable indicator for each group-level action. In accordance with one or more embodiments, a message group entry in the message group display portion comprises a count of how many messages belong to the group. In accordance with one or more embodiments, one or more messages shown in a message list portion of the user interface may be selected from the message list based on similarity of the message(s) to previously selected messages, and the selected message(s) may be grouping based on shared attribute values. The messages belonging to a group may be modified in the same way via a single action taken on the group.

FIG. 1 provides an exemplary component overview in accordance with one or more embodiments of the present disclosure. The example includes a client computing device, or client computer, 102 and a server computing device, or server computer, 104. The client computer 102 includes a messaging application 106, such as and without limitation an e-mail client application, and the server computer 104 includes a messaging service, such as an e-mail messaging service. Client computer 102 and server computer 104 may be interconnected via one or more networks.

Client computer 102 may include any computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows®, iOS® or Linux®, or a mobile operating system, such as iOS®, Android®, or Windows Mobile®, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Server computer 104 may be any computing device including a computing device capable of sending or receiving signals, such as via a wired or wireless network, or capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows® Server, Mac OS X®, Unix®, Linux®, FreeBSD®, or the like.

A content server may include a device that includes a configuration to provide content via a network to another device. A content server may, for example, host a site, such as a social networking site, examples of which may include, without limitation, Flicker®, Twitter®, Facebook®, LinkedIn®, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

Figure 2:
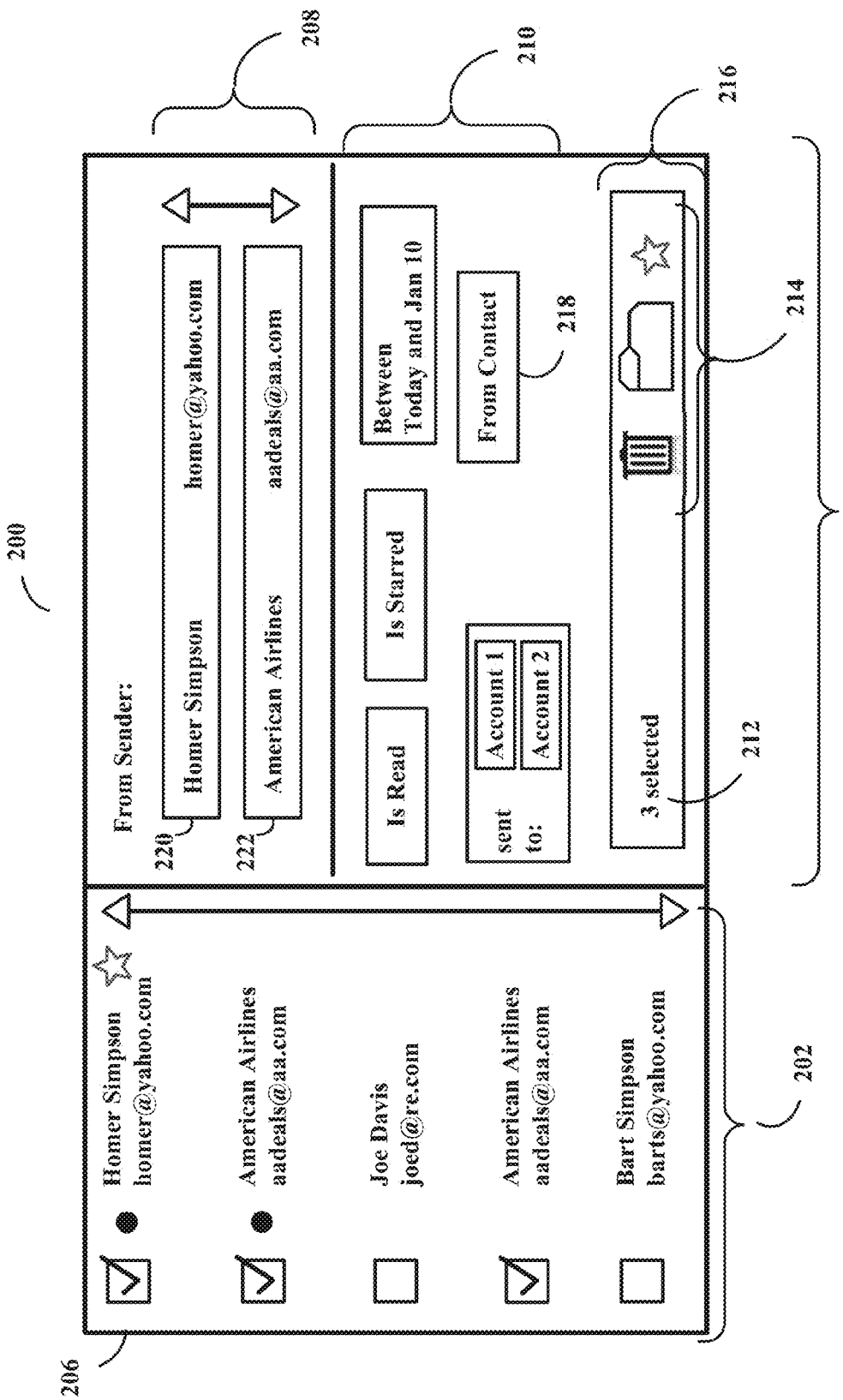

FIG. 2 provides an example of a message selection assistant user interface in accordance with one or more embodiments of the present disclosure. In accordance with one or more embodiments, the message selection assistant user interface 200 may be displayed by messaging application 206 on client 202, and may display messages received by client 202 via the messaging service 108 of server 104.

In the example, the message selection assistant user interface 200 comprises a message list portion 202 and a message group display portion 204. The message list portion 202 displays a set of messages, e.g., a set of messages from a message folder. Each message in the list has one or more attributes and corresponding attribute values. The list may be a sorted list by one or more of the attribute values. Each entry in the list corresponds to a message and displays at least one attribute value of the message. In the example shown in FIG. 2, a user-friendly name of the message's sender and an address, e.g., an e-mail address, assigned to the sender.

Each entry, or item, in the list shown in the message list portion 202 is selectable, and an indicator 206 indicates whether or not the message has been selected. In the example, shown in FIG. 2, the selection indicator 206 comprises an empty box if the message is not selected and a checked box if the message is selected.

In accordance with one or more embodiments, as the user selects (or de-selects) a message, it is added to, or removed from in the case of that the message is de-selected, a selected messages data source. In response, user interface 200 is updated so that the list displayed in message list portion 202 reflects the selection, or de-selection. By way of a non-limiting example, if the user selects an item in the list, indicator 206 is updated from an empty box to a checked box, and if the user de-selects an item in the list, indicator 206 is updated from a checked box to an empty box. As is discussed herein, one or more messages may be selected, or de-selected, automatically for the user in response to an action taken in message group display portion 204, and indicator 206 is updated in much the same manner as if the user selected, or de-selected, each message in message list portion 202. In the latter case, however, the user need not point to each message individually to select, or de-select, the message.

To illustrate further, in accordance with one or more embodiments, message group display portion 204 displays additional controls which the user can use to further expand or reduce the selection by multiple items, or multiple messages, at a time. In accordance with one or more embodiments, the multiple messages that are acted upon each match a chosen criterion, or criteria. In accordance with one or more embodiments, the chosen criterion/criteria comprise one or more attribute values of the messages included in the list represented in the message list portion 202. By way of some non-limiting example, the additional controls displayed in the message group display enable the user to perform actions on all items selected in the message list portion 202 or on a subset of the items selected in the message list portion 202. In the latter case, the additional controls comprise group-level controls, or actions, that enable the user to perform actions on the messages belonging to a given message group, e.g., a group of messages that satisfy the search criteria associated with the message group. The search criteria may comprise one or more attribute values and each message in the message group is determined to have the one or more attribute values.

In the example shown in FIG. 2, the message group display portion 204 comprises an area 208 displaying controls 220 and 222, each of which may be clicked on, or otherwise selected, by the user to have messages automatically selected for the user. In the case of either control 220 or 222, or any other control listed in area 208, for example, the user's selection of the control causes all messages that share the sender's email address being represented by the control to be automatically selected for the user. A scrolling feature may be used to display other "from sender" messages group controls that may exist. In the example, the messages belonging to message group 220 share the same value for the "from sender" attribute used as search criteria for the message group, and the messages belonging to message group 220 each share the same value for the "from sender" attribute used as search criteria for the message group. To illustrate further using the sender's email address as the attribute used as the search criterion, all of the messages in message group 220 share the same value for the email address attribute, e.g., homer@yahoo.com, and all of the messages in message group 222 share the same sender's email address value, e.g., aadeal@aa.com.

To illustrate further a group may be formed using a user-friendly sender name attribute, and each message belonging to the group has a common value for the attribute, e.g., such as and without limitation Homer Simpson, American Airlines, etc.

Message group display portion 204 includes an area 210 that represents potential message groupings, or possible search criteria that may be used to identify one or more messages represented in message list portion 202. For example, control 218 represents that one or more of the selected messages is from a sender in the user's list of contracts, such as an address book. The user is able to select the control to have all of the other messages in the message list portion 202 selected automatically for the user. Thus, in response to the user's selection of control 218, each entry in the message list portion 202 that satisfies the search criteria, i.e., was sent from someone in the user's list of contacts, is selected. In accordance with one or more embodiments, each time a message is selected by the user in message list portion 202 or in response to a control selected from message group display portion 204, the control display area 210 may be updated or refreshed to include new and/or different controls. To illustrate, each time one or more messages are selected, the selected messages are analyzed to identify one or more potential search criteria to associate with a control displayed in area 210. Each potential search criteria comprising at least one attribute value identified by analyzing the selected messages to identify one or more attribute values associated with at least one selected message, the at least one attribute value may be shared by the at least one selected message as well as other, non-selected messages, and a control associated with the potential search criteria may be selected by the user to cause all of the messages that have the same one or more attribute values to be automatically selected for the user in response to the control's selection.

In the example shown in FIG. 2, message group display portion 201 includes a message count 212 of how many messages are selected. In the example, there are three selected messages. In the example, the message count in displayed in a toolbar 216, which includes a number of selectable actions indicators 214, each action indicator is selectable to perform an action on all of the selected messages. In the example, the action toolbar 216 is a selected-messages toolbar, and the actions and message count are relative to all of the messages selected. In accordance with one or more embodiments, a toolbar may be associated with a message group, e.g., message group 220 and/or message group 222, and/or a toolbar may be associated with a control, i.e., a potential message group.

Figure 3:
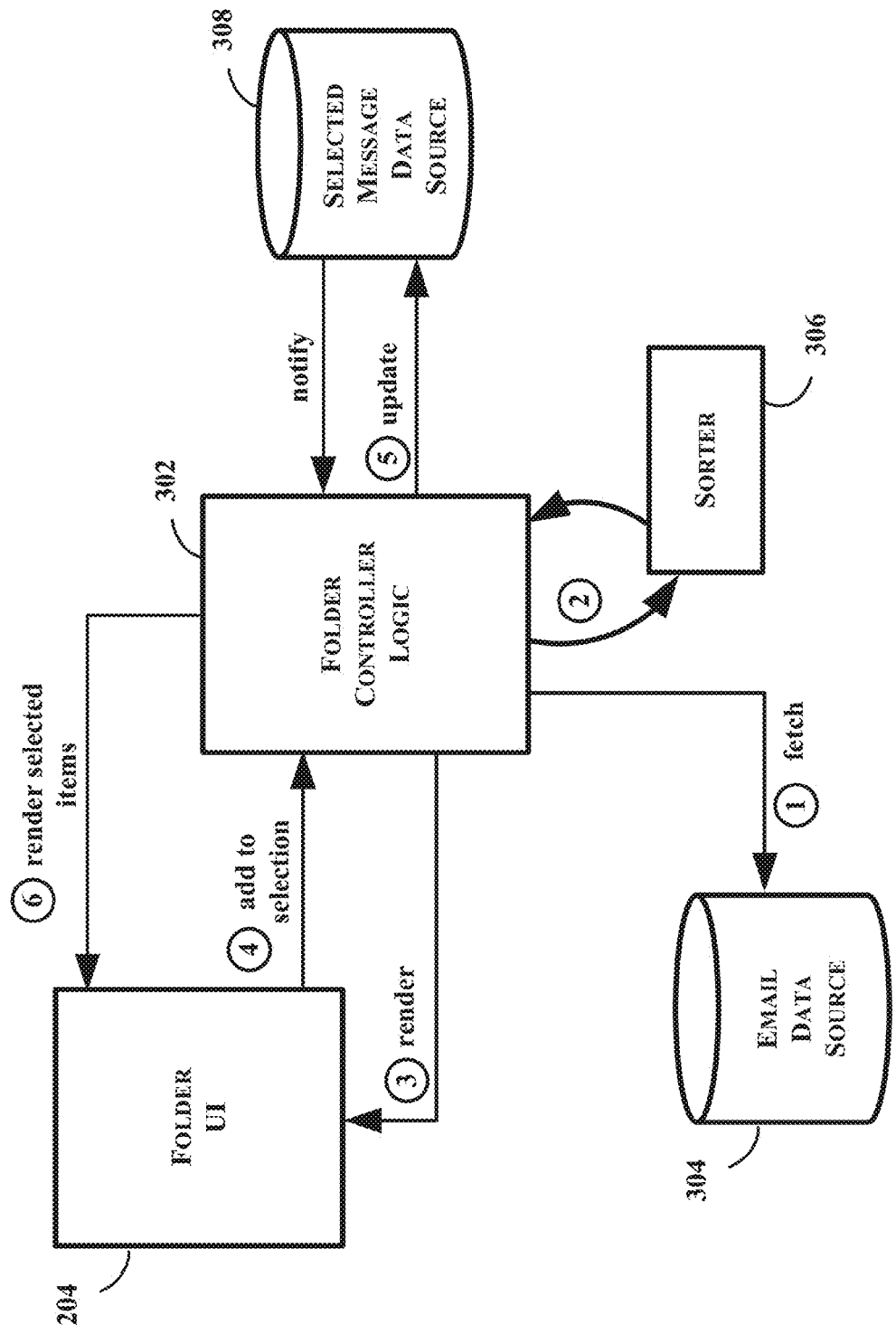

In accordance with one or more embodiments, FIG. 3 provides a message selection data flow in connection with the message list portion 202 of user interface 200, and 4 provides an enhanced message selection data flow in connection with message group display portion 204.

In accordance with one or more embodiments, the messages that are currently selected are examined to identify one or more attribute values that are shared by two or more selected messages. An actionable button, or control, that represents the one or more attribute whose value(s) is/are shared may be created and displayed in the message group display portion 201. Such an actionable button, or control, is selectable to select other messages, e.g., other unselected messages, that also share the same one or more attribute values. By way of a non-limiting example, providing such a control assists the user in identifying and selecting other messages that are like the one or more messages that the user has previously selected, and reduces the work necessary by the user to select similar messages. By way of a non-limiting example, advantageously, such controls enable the user to view a large set of emails as message groups, rather than as individual messages, and to select a group of messages using a single action, e.g., to select a control representing a group of messages, rather than selecting each message individually.

In accordance with one or more embodiments, and by way of some non-limiting examples, the messages, or entries representing messages, currently selected in the message list display portion 202 may include one or more messages that are from sender A, which may cause a control, or button, to appear in message group display portion 204 that enables a user to select all of the other messages represented in message list display portion 202 from sender A. As a further illustration and in accordance with one or more embodiments, the messages currently selected in the message list display portion 202 may include one or more messages that have a date, e.g., a receive date, a send date, etc., that fall within a date range of "today" through two weeks past, which may cause a slider to appear enabling the user to select all of the other messages represented in message list display portion 202 that fall within the date range. In accordance with one or more embodiments, the slider might enable the user redefine or refine the range parameters, e.g., a range of "today" through one week ago or three weeks ago and so on.

In accordance with one or more embodiments, the messages currently selected in the message list display portion 202 may include one or more messages for which the user, e.g., the message account user, is included in the "cc" field, which may cause a button to appear in the message group display portion 204 enabling the user to select all messages on which the user is "cc'd".

In accordance with one or more embodiments, the messages currently selected in the message list display portion 202 may include one or more messages that are not from senders in the user's address book, which may cause a button to appear in the message group display portion 204 enabling the user to select all messages from non-contact senders, e.g., senders not in the user's address book.

In accordance with one or more embodiments, the messages currently selected in the message list display portion 202 may include one or more messages having one or more phone numbers in the message body, which may cause a button to appear in the message group display portion 204 enabling the user to select all messages that have a phone number in the message body.

In accordance with one or more embodiments, the messages currently selected in the message list display portion 202 may include one or more messages that were sent to a different email address of the user, e.g., an email alias used by the account user, which may cause a button to appear in the message group display portion 204 enabling the user to select all messages that that were sent to that alias.

In accordance with one or more embodiments, the messages currently selected in the message list display portion 202 may include one or more messages that have a similar "display name", e.g., a similar user-friendly name, which may cause a button to appear in the message group display portion 204 enabling the user to select all messages that have the same or a similar display name.

With reference to FIG. 3, folder controller logic 302 may be one or more components of messaging application 106 and/or, one or more components of messaging service 108. In accordance with one or more embodiments, the one or more components that implement the folder controller logic 302 on client 102 may be in communication with one or more components of server 104.

In the example of FIG. 3, folder controller 302 fetches email message content, e.g., some or all of the content of messages stored in a message folder, e.g., an inbox, sent folder, use-defined saved messages folder, etc., from email data source 304. The messages may be sorted by sorter 306 to create a sorted list of messages. Folder controller 302 renders the message list, which is displayed at client 102, e.g., in the message list portion 202 of user interface 200. A user is able to select and/or de-select messages by interacting with the items displayed in the message list portion 202 as previously discussed.

In response to the user selecting a message, the message is added to selected message data source 308. A message is removed from the selected data source 308 in response to the user's de-selection of the message. Each time the user selects a message, or de-selects message, the selected message data source 308 is updated, and folder controller 302 is notified of the selection, or de-selection. In response to a notification, the folder controller 302 renders the selected items in message list portion 202 and updates the message selection assistant user interface 200 displayed at client 102. A notification received by controller 302 may be as a result of an action taken in the message group display portion 204. By way of a non-limiting example, an action that selects a group of messages based on selected search criteria, e.g., search criteria associated with control 218, may result in one or more notifications being received by controller 302. Controller, 302 may re-render, and update, the display of message list portion 202 to reflect the change in message selection(s) in response to the one or more notifications.

In accordance with one or more embodiments, in response to one or more selections being made or changed via message list portion 202, message group display portion 204 may be updated and may include interface elements that may be used to perform actions on the selected messages or a subset of the selected message that match one or more criteria.

Figure 4:
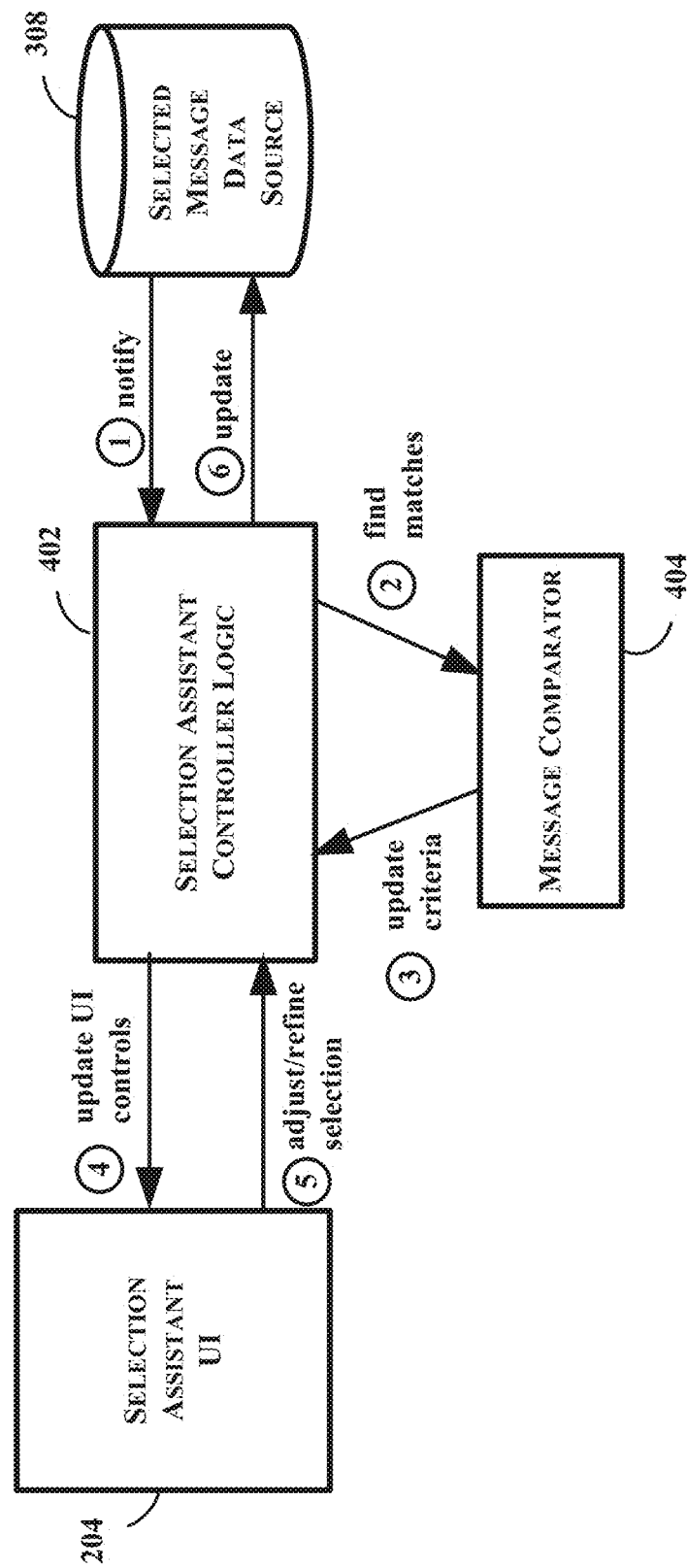

With reference to FIG. 4, a selection assistant controller logic component, or selected message assistant (SMA), 402 operates to control the message group display portion 204 of user interface 200. SMA 402 may be one or more components of messaging application 106 and/or one or more components of messaging service 108. In accordance with one or more embodiments, the one or more components that implement the SMA 402 on client 102 may be in communication with one or more components of server 104.

SMA 402 may be notified of changes to the selected message data source 308 in response to changes made via message list portion 202. In response to a notification from selected message data source 308, SMA 402 uses message comparator 404 to extract common or similar attributes from the selected messages. SMA 402 updates the user interface 200, e.g., the message group display portion 204, to include interface elements, e.g., controls such as control 218, representing these attribute values.

The user may interact with the message group display portion 204 to adjust or refine the user's selection(s) using controls selectable via message display portion 204. The SMA 402 updates the selected message data source 308 to reflect the user's control selections, and the user interface 200 is updated. By way of a non-limiting example, a control selected from the message group display may result in a notification being made to the folder controller 302 to update the message list portion 202. For example, the user may select a control 218 to select messages that satisfy the search criteria associated with control 218, which results in the entries corresponding to the messages that satisfy the search criteria being updated in the message list portion 202 to indicate their selection. To further illustrate, a group might be removed using a control displayed in the message group display portion 204, which results in the messages in the group being de-selected and the corresponding entries in the message list portion 202 being updated to indicate the de-selections, and the group being removed from the message group display portion 204 by SMA 402. As yet another example, the user may select an action to move all of the selected messages, or all of the selected messages in a group, to a save folder, which would result in the messages being removed from the message list portion 202 of the user interface 200, and the group being removed from the message group display portion 204 by SMA 402.

In accordance with one or more embodiments, one or more group-level actions may be initiated for a group, and in response, the group-level action is performed on each message belonging to the group. In accordance with one or more embodiments, the one or more messages that are grouped may be selected by the user and/or automatically selected for the user.

Figure 5:
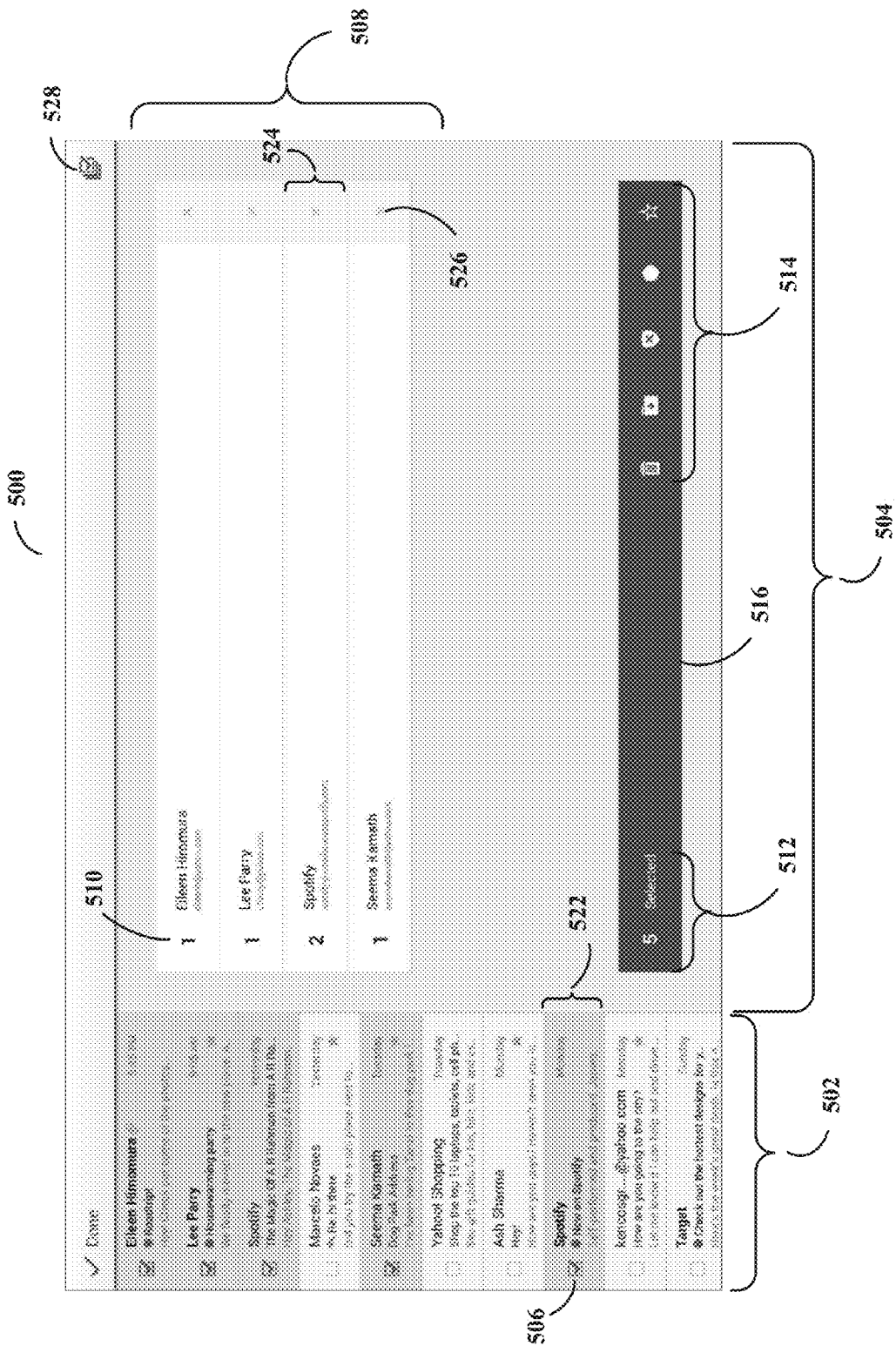

FIG. 5 provides an example of a user interface in accordance with one or more embodiments of the present disclosure. In the example, user interface 500 comprises a message list portion 502 and a message group display portion 504. The message list portion 502 includes selected and unselected entries. As depicted by indicator 506, entry 522, which is from Spotify, is a selected entry. Message group display portion 504 comprises a toolbar 516 that comprise a count 512 of the number of messages/entries selected and a toolbar 514. Toolbar 514 comprises indicators of actions, each of which is selectable to initiate an action on each of the selected entries/messages. Toolbar 514 includes some examples of action indicators that might be performed on the selected entries/messages. From left to right, the icons, or indicators, represent a trash operation, a move-to-folder operation, a mark-as-spam operation, mark-as-unread operation, and a flag-as-important operation. It should be apparent that other operations may be used in addition to or replacement for the operations shown in toolbar 514. Any action available on email messages by the application is also available to take on the selected items at once. Some further non-limiting examples include: move to trash, reply, reply-All, forward, add sender to contacts/address book, copy, message body, display as full screen, print, etc. It should be apparent that any action now know or later developed may also be used, e.g., added to a toolbar, and be performed on selected messages.

To illustrate further, in response to selection of the move-to-folder action indicator, each of the messages selected in the message list portion 502 is moved to a folder bin, and the entries corresponding to the messages moved to the folder are removed from the message list displayed in message list portion 502. Similarly, in response to selection of trash action indicator, each of the messages selected in the message list portion 502 is moved to a folder bin, and the entries corresponding to the messages moved to the trash bin are removed from the message list displayed in message list portion 502. In response selection of the mark-as-spam action indicator, each of the messages selected in the message list portion 502 is marked as spam, and the entries corresponding to the messages marked as spam may be updated in the message list displayed in message list portion 502 to indicate that the messages are marked as spam. In response selection of the mark-as-unread action indicator, each of the messages selected in the message list portion 502 is marked as unread, and the entries corresponding to the messages marked as unread may be updated in the message list displayed in message list portion 502 to indicate that the messages are unread. In response selection of the flag-as-important action indicator, each of the messages selected in the message list portion 502 is flagged as important, and the entries corresponding to the messages flagged as important may be updated in the message list displayed in message list portion 502 to indicate that the messages are important, e.g., the corresponding messages might be displayed with an asterisk in the message list portion 502.

In the example shown in FIG. 5, user interface 500 includes an action indicator 528, which is selectable to cause all of the messages in the message list displayed in message list portion 502 to be selected and included in a group. In effect, an automatic "check all" and "group all" operation on all of the messages in the message list. The operation might be used to reveal a message, or message buried among the messages in a message folder, and possibly forgotten.

The user interface 500 shown in FIG. 5 also a list 508 of groups. One such entry 525 is a group of messages from Spotify. Each group in list 508 includes an indicator 510 displaying a count of how many messages are including in the group. Each group in the list 508 includes an action indicator 526, which is selectable to remove the corresponding group from the list, which effectively de-selects the messages contained in the group being removed. In the example, if action indicator 526 corresponding to entry 524 is selected, message group display portion 504 would be updated to remove entry 524 from list 508 and entry 522 in message list portion 502 would be updated to indicate that the message is no longer selected, e.g., indicator 506 would be updated from a checked box to an empty box.

In the example shown in FIG. 5, toolbar 516 acts on all selected messages. In accordance with one or more embodiments, a toolbar may be associated with each group that has an entry in list 508. In accordance with one or more embodiments, the group-level toolbar may be displayed at the time an entry is added to list 508 for the group. Alternatively, the group-level toolbar may be displayed in response to a user request, and/or gesture requesting, for the toolbar. By way of one non-limiting example, the gesture might be a swipe gesture within the group's entry in list 508.

It should be apparent that any technique now known or later developed may be used to cause the group-level toolbar to be displayed.

Figure 6:
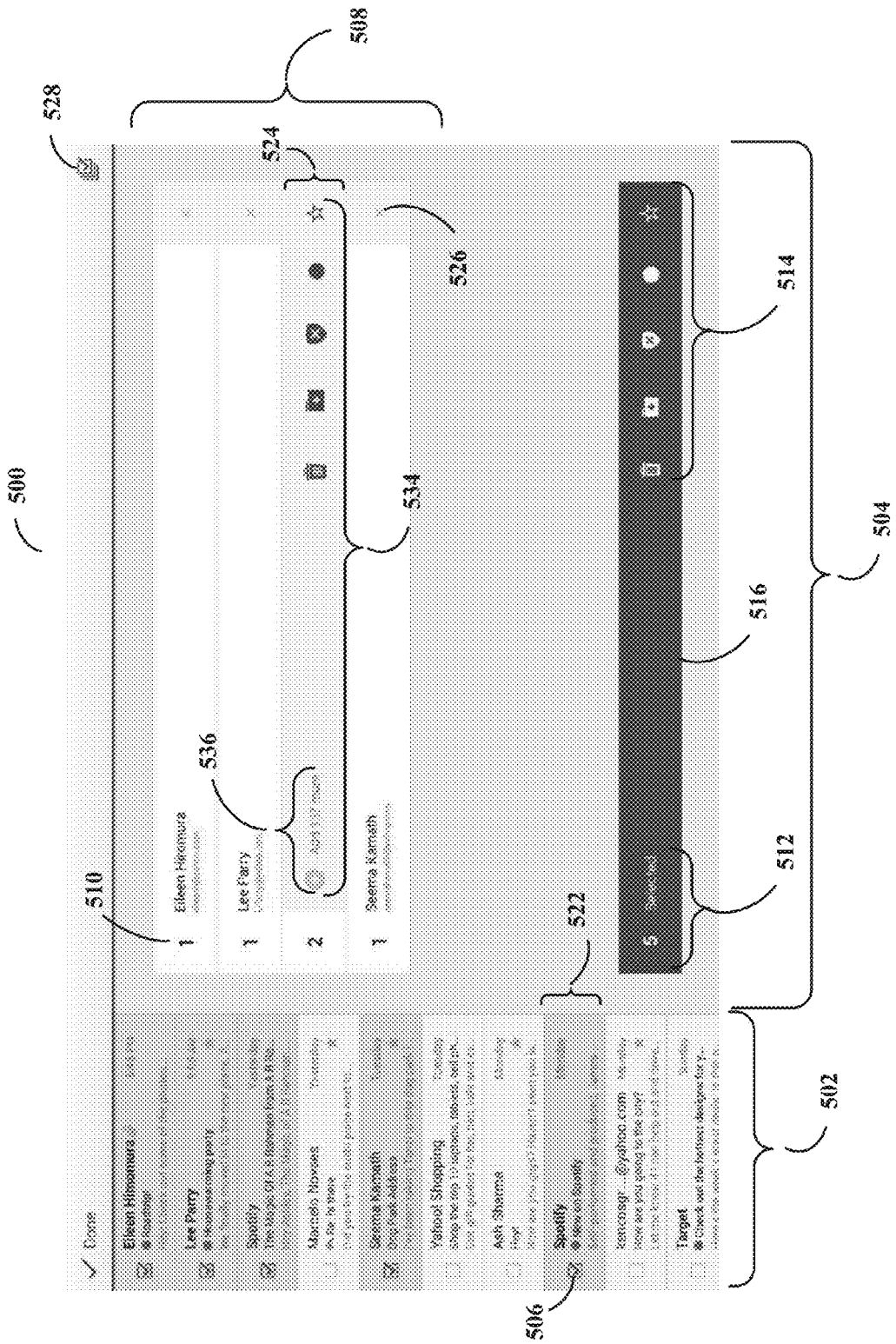

FIG. 6 provides an example of the user interface of FIG. 5 with a group-level toolbar being displayed in connection with a group displayed in the user interface in accordance with one or more embodiments of the present disclosure. In the example, group-level toolbar 534 is displayed as entry 524 in list 508. The group-level toolbar 534 includes many of the same action indicators discussed in connection with toolbar 516. In addition, group-level toolbar 534 includes an add-to-group action indicator 536, which is selectable to add unselected messages meeting the group's selection criteria to the group. In the example, the add-to-group action indicator 536 is selectable to add any messages from Spotify that are not yet selected. Each entry in the message list portion 502 corresponding to a message newly-selected and included in the group as a result of selection of the add-to-group action indicator 536 would be updated to indicate that the message is a selected message, count indicator 512 is updated to reflect any newly-selected messages.

Figure 7:
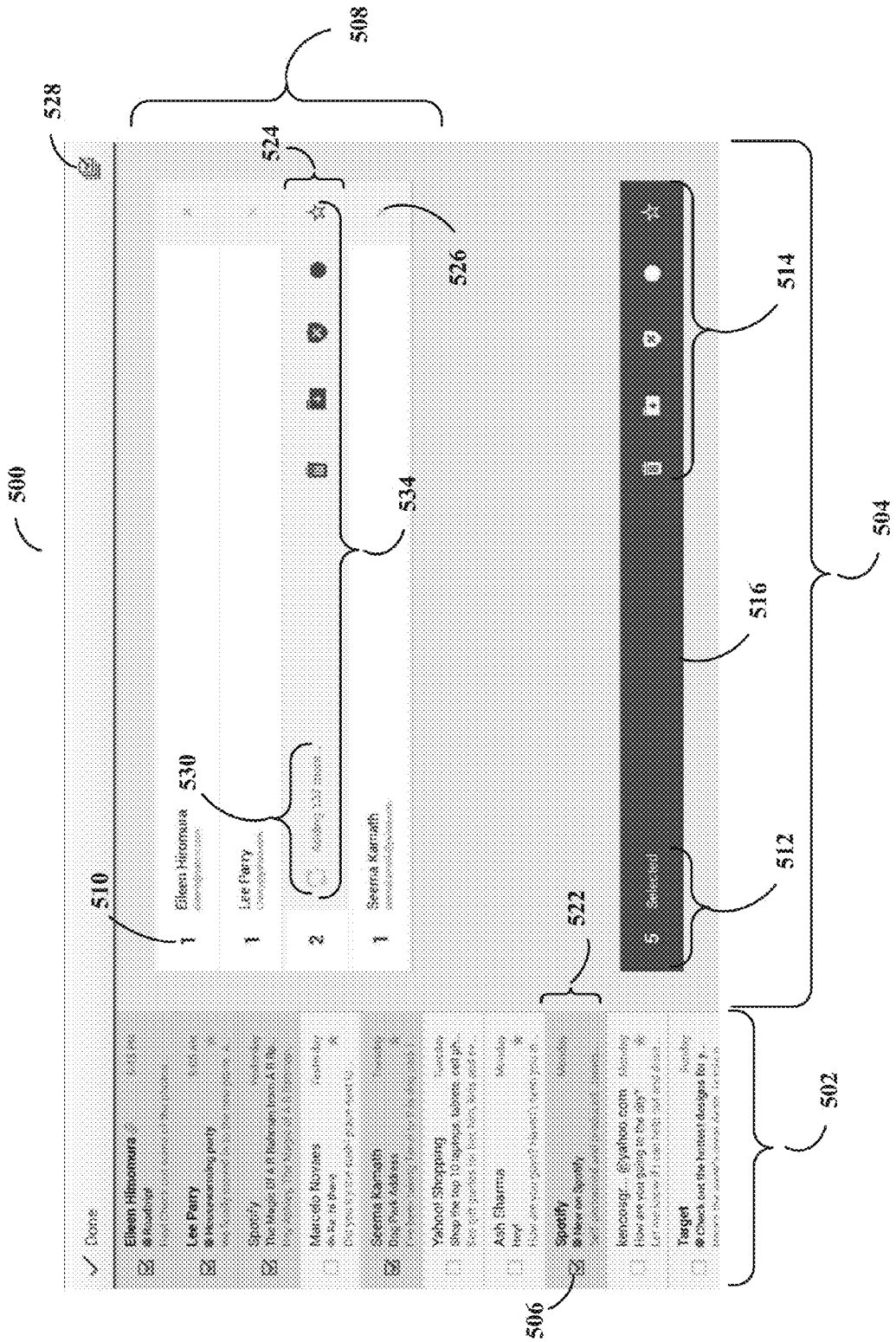

FIG. 7 provides an example of the user interface of FIG. 5 in connection with a group-level add action in accordance with one or more embodiments of the present disclosure. In the example, the add-to-group action indicator 536 shown in FIG. 6 is replace with an indicator 530 indicating the number of new messages being selected and added to the group as a result of the selected action.

In accordance with one or more embodiments, an action performed on all selected messages, e.g., an action performed in connection with toolbar 516 or an action performed on a group of messages, e.g., an action performed in connection with toolbar 524 may be undone.

Figure 8:
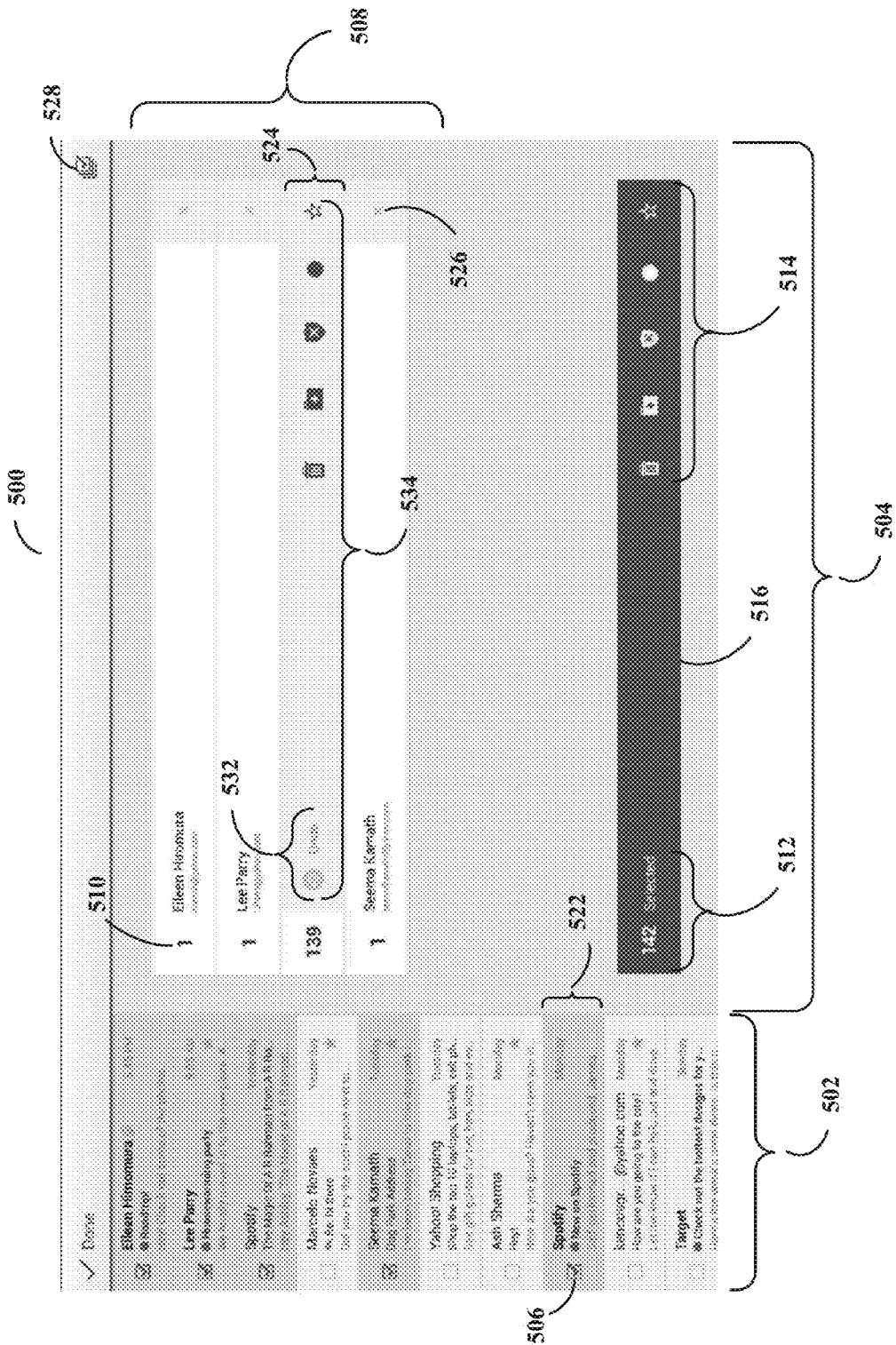

FIG. 8 provides an example of the user interface of FIG. 5 in connection with a group-level undo action in accordance with one or more embodiments of the present disclosure. In the example, toolbar 524 comprises an undo action indicator 532, which may be selected to remove the messages selected and added to the group in response to selection of the add-to-group action indicator 536.

As shown in FIG. 8, the group level count 510 for the updated group and the overall count 512 of selected messages are updated as a result of the add-to-group operation.

Figure 9:
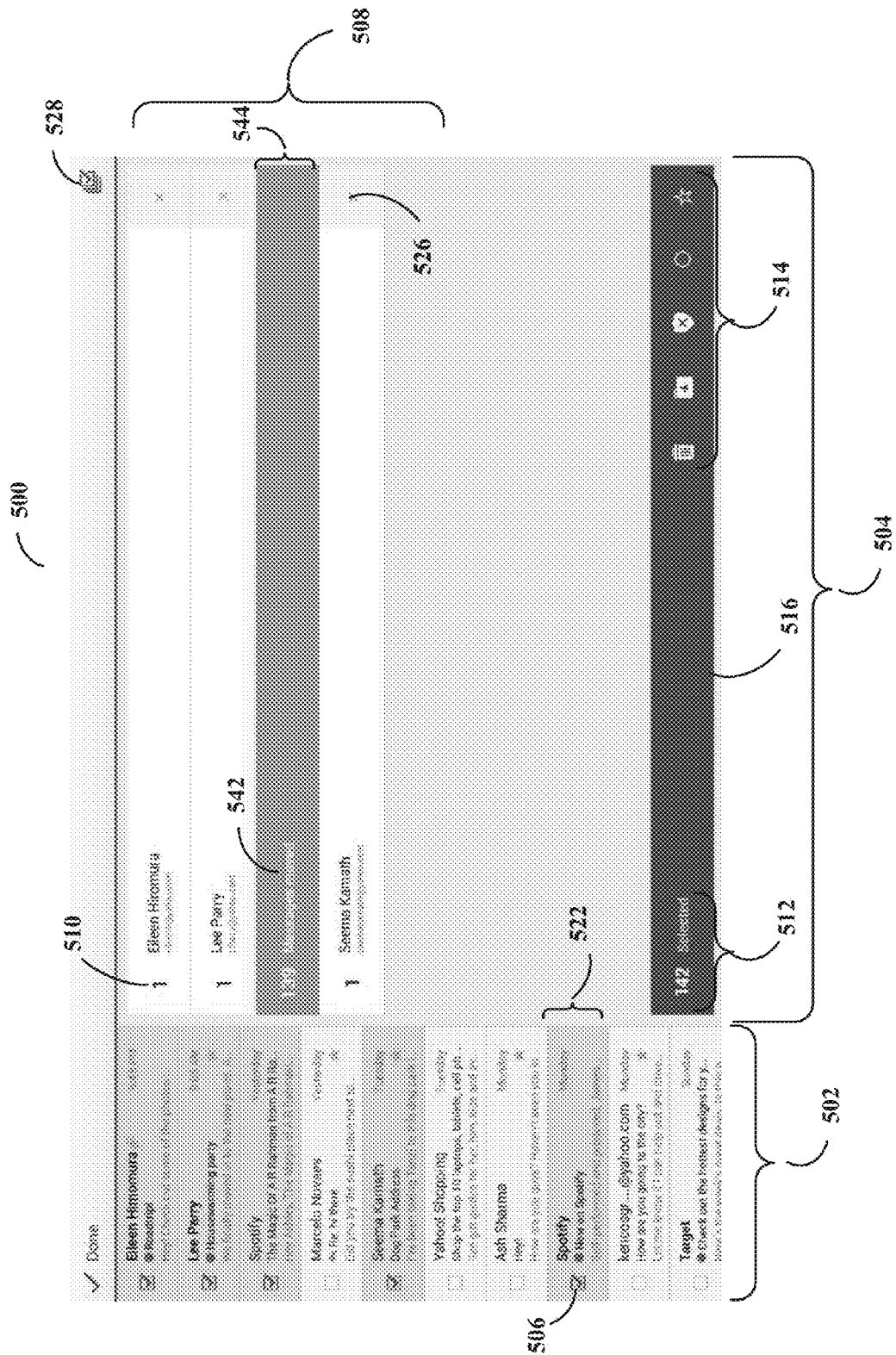

FIG. 9 provides an example of the user interface of FIG. 5 in connection with a group-level move action in accordance with one or more embodiments of the present disclosure. After the move-to-folder operation is performed, the group entry is updated to reflect the number of messages moved.

Figure 10:
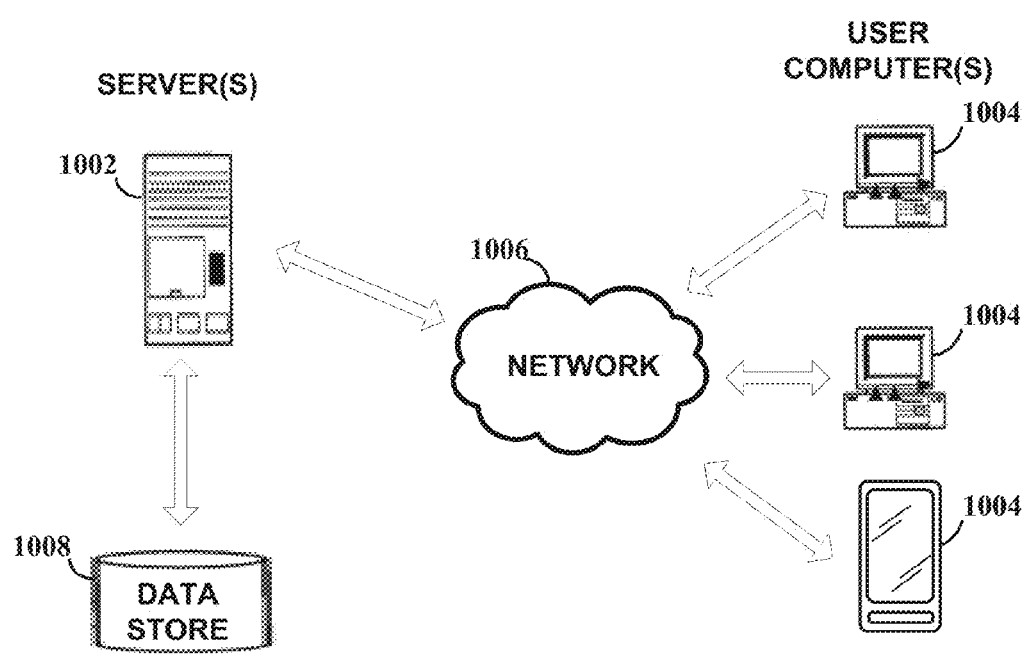
FIG. 10 illustrates some components that can be used in connection with one or more embodiments of the present disclosure.

FIG. 10 illustrates some components that can be used in connection with one or more embodiments of the present disclosure. In accordance with one or more embodiments of the present disclosure, one or more computing devices, e.g., one or more server devices 104, client devices 102 or other computing device, are configured to comprise functionality described herein. For example, a computing device 1002 can be configured to execute program code, instructions, etc. to provide functionality in accordance with one or more embodiments of the present disclosure.

Computing device 1002 can serve content to user computing devices 1004 via a network 1006. Computing device 1002 may be server 104, which executes messaging service 108 and serves messages to messaging application 106 of client device 102. Data store 1008 can be used to store data and or program code to configure a server 1002 to execute one or more embodiments of the present disclosure.

The user computing device 1004, which may be an example of client device 102, can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 1002 and the user computing device 1004 can include one or more processors, memory, a removable media reader, network interface, display and interface, and one or more input devices, e.g., keyboard, keypad, mouse, etc. and input device interface, for example. One skilled in the art will recognize that server 1002 and user computing device 1004 may be configured in many different ways and implemented using many different combinations of hardware, software, or firmware.

In an embodiment the network 1006 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may intemperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 10. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 11:
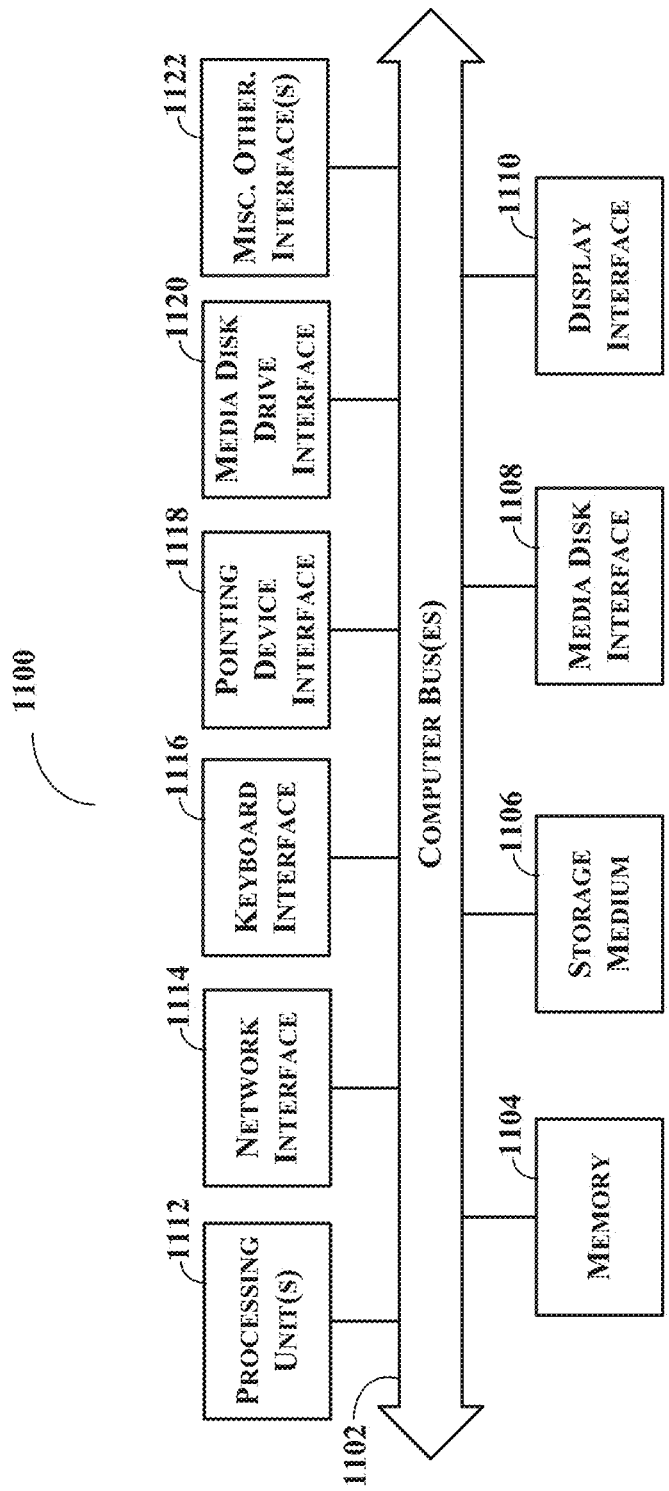
FIG. 11 is a detailed block diagram illustrating an internal architecture of a computing device in accordance with one or more embodiments of the present disclosure.

FIG. 11 is a detailed block diagram illustrating an internal architecture of a computing device, e.g., a computing device such as server 1002 or user computing device 1004, in accordance with one or more embodiments of the present disclosure. As shown in FIG. 11, internal architecture 1100 includes one or more processing units, processors, or processing cores, (also referred to herein as CPUs) 1112, which interface with at least one computer bus 1102. Also interfacing with computer bus 1102 are computer-readable medium, or media, 1106, network interface 1114, memory 1104, e.g., random access memory (RAM), run-time transient memory, read only memory (ROM), etc., media disk drive interface 1120 as an interface for a drive that can read and/or write to media including removable media such as floppy, CD-ROM, DVD etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, computer-readable storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage, e.g., medium/media 1106, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, RUM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
providing, by a computing device, a messaging user interface comprising a message list portion and a message group display portion, each entry displayed in the message list portion corresponding to a message of a plurality of messages, each message having one or more attributes and corresponding values, the message group display portion comprising a number of user-selectable controls, the user-selectable controls comprising a user-selectable contacts control to request a search for messages of the plurality having at least one attribute value in correspondence with a value from the user's contacts stored in an electronic address book of the user to group messages using information stored in the electronic address book of the user;
receiving, by the computing device, input indicative of a selection of the contacts control;
in response to receiving the input indicative of a selection of the contacts control:
performing, by the computing device, the search of the plurality of messages for identifying a number of messages of the plurality having the at least one attribute value in correspondence with a value from the user's contacts stored in the electronic address book of the user, the search comprising, for each message of the plurality, comparing the at least one attribute value from the message with the information stored in the electronic address book of the user to make a determination whether there is a correspondence between the message and the information stored in the electronic address book of the user;
analyzing, by the computing device, each of the number of identified messages to identify message groups, each identified message group comprising multiple messages, of the number of identified messages, having at least one common attribute value found in each of the multiple messages and in the information stored in the electronic address book of the user; and updating, by the computing device, the message group display portion to display an indicator for each identified message group, each identified message group's indicator indicating the at least one common attribute value of the message group and being selectable by the user to initiate an automatic message selection operation.

2. The method of claim 1, further comprising:
in response to the user's selection input indicating a selected message group indicator, performing an automatic message selection using the at least one common attribute value of the message group as search criteria to identify any unselected messages with the at least one common attribute value.

3. The method of claim 2, further comprising:
updating a selection indicator in the message list portion to reflect any newly-selected messages that have the at least one attribute value.

4. The method of claim 1, further comprising:
providing, by the computing device, a toolbar in the messaging user interface, the toolbar comprising at least one indicator of an action selectable to cause the action to be performed on each selected message in response to selection of the action;
receiving, by the computing device, input indicative of a user's selection of an action indicator; and
in response to receiving the input indicative of a user's selection of the action indicator, performing the selected action on each selected message.

5. The method of claim 1, the user-selectable controls further comprising a user-selectable control to request a search for messages of the plurality marked as read.

6. The method of claim 1, the user-selectable controls further comprising a user-selectable control to request a search for messages of the plurality having a sender attribute value absent from the user's contacts.

7. The method of claim 1, the user-selectable controls further comprising a user-selectable control to request a search for messages of the plurality sent to a specified messaging account.

8. A non-transitory computer-readable storage medium tangibly encoded with computer-executable instructions, that when executed by a processor associated with a computing device, performs a method comprising:
providing a messaging user interface comprising a message list portion and a message group display portion, each entry displayed in the message list portion corresponding to a message of a plurality of messages, each message having one or more attributes and corresponding values, the message group display portion comprising a number of user-selectable controls, the user-selectable controls comprising a user-selectable contacts control to request a search for messages of the plurality having at least one attribute value in correspondence with a value from the user's contacts stored in an electronic address book of the user to group messages using information stored in the electronic address book of the user;
receiving input indicative of a selection of the contacts control;
in response to receiving the input indicative of a selection of the contacts control:
performing the search of the plurality of messages for identifying a number of messages of the plurality having the at least one attribute value in correspondence with a value from the user's contacts stored in the electronic address book of the user, the search comprising, for each message of the plurality, comparing the at least one attribute value from the message with the information stored in the electronic address book of the user to make a determination whether there is a correspondence between the message and the information stored in the electronic address book of the user;

analyzing each of the number of identified messages to identify message groups, each identified message group comprising multiple messages, of the number of identified messages, having at least one common attribute value found in each of the multiple messages and in the information stored in the electronic address book of the user; and updating the message group display portion to display an indicator for each identified message group, each identified message group's indicator indicating the at least one common attribute value of the message group and being selectable by the user to initiate an automatic message selection operation.

9. The non-transitory computer-readable storage medium of claim 8, further comprising:

in response to the user's selection input indicating a selected message group indicator, performing an automatic message selection using the at least one common attribute value of the message group as search criteria to identify any unselected messages with the at least one common attribute value.

10. The non-transitory computer-readable storage medium of claim 9, further comprising:

updating a selection indicator in the message list portion to reflect any newly-selected messages that have the at least one attribute value.

11. The non-transitory computer-readable storage medium of claim 8, further comprising:

providing a toolbar in the messaging user interface, the toolbar comprising at least one indicator of an action selectable to cause the action to be performed on each selected message in response to selection of the action;

receiving input indicative of a user's selection of an action indicator; and in response to receiving the input indicative of a user's selection of the action indicator, performing the selected action on each selected message.

12. The non-transitory computer-readable storage medium of claim 8, the user-selectable controls further comprising a user-selectable control to request a search for messages of the plurality marked as read.

13. The non-transitory computer-readable storage medium of claim 8, the user-selectable controls further comprising a user-selectable control to request a search for messages of the plurality having a sender attribute value absent from the user's contacts.

14. The non-transitory computer-readable storage medium of claim 8, the user-selectable controls further comprising a user-selectable control to request a search for messages of the plurality sent to a specified messaging account.

15. A computing device comprising:

a processor;

a non-transitory computer-readable storage medium for tangibly storing thereon program logic for execution by the processor, the program logic comprising: providing logic executed by the processor for providing a messaging user interface comprising a message list portion and a message group display portion, each entry displayed in the message list portion corresponding to a message of a plurality of messages, each message having one or more attributes and corresponding values, the message group display portion comprising a number of user-selectable controls, the user-selectable controls comprising a user-selectable contacts control to request a search for messages of the plurality having at least one attribute value in correspondence with a value from the user's contacts stored in an electronic address book of the user to group messages using information stored in the electronic address book of the user;

receiving logic executed by the processor for receiving input indicative of a selection of the contacts control;

in response to receiving the input indicative of a selection of the contacts control: performing logic executed by the processor for performing the search of the plurality of messages for identifying a number of messages of the plurality having the at least one attribute value in correspondence with a value from the user's contacts stored in the electronic address book of the user, the search comprising, for each message of the plurality, comparing the at least one attribute value from the message with the information stored in the electronic address book of the user to make a determination whether there is a correspondence between the message and the information stored in the electronic address book of the user;

analyzing logic executed by the processor for analyzing each of the number of identified messages selected in the message list portion to identify message groups, each identified message group comprising multiple selected messages, of the number of identified messages, having at least one common attribute value found in each of the multiple messages and in the information stored in the electronic address book of the user: and updating logic executed by the processor for updating the message group display portion to display an indicator for each identified message group, each identified message group's indicator indicating the at least one common attribute value of the message group and being selectable by the user to initiate an automatic message selection operation.

16. The computing device of claim 15, further comprising:

in response to the user's selection input indicating a selected message group indicator, performing logic executed by the processor for performing an automatic message selection using the at least one common attribute value of the message group as search criteria to identify any unselected messages with the at least one common attribute value.

17. The computing device of claim 16, further comprising:

updating logic executed by the processor for updating a selection indicator in the message list portion to reflect any newly-selected messages that have the at least one attribute value.

18. The computing device of claim 15, further comprising:

providing logic executed by the processor for providing a toolbar in the messaging user interface, the toolbar comprising at least one indicator of an action selectable to cause the action to be performed on each selected message in response to selection of the action;

receiving logic executed by the processor for receiving input indicative of a user's selection of an action indicator; and in response to receiving the input indicative of a user's selection of the action indicator, performing logic executed by the processor for performing the selected action on each selected message.

19. The computing device of claim 15, the user-selectable controls further comprising a user-selectable control to request a search for messages of the plurality marked as read.

20. The computing device of claim 15, the user-selectable controls further comprising a user-selectable control to request a search for messages of the plurality having a sender attribute value absent from the user's contacts.

21. The computing device of claim 15, the user-selectable controls further comprising a user-selectable control to request a search for messages of the plurality sent to a specified messaging account.

\* \* \* \* \*